(12) United States Patent
Garm et al.

(10) Patent No.: US 10,961,979 B2
(45) Date of Patent: Mar. 30, 2021

(54) REINFORCED WIND TURBINE BLADE COMPONENT

(71) Applicant: LM WP PATENT HOLDING A/S, Kolding (DK)

(72) Inventors: Jesper Hasselbalch Garm, Kolding (DK); Michael Wenani Nielsen, Kolding (DK); Peter Quiring, Rodding (DK); Kildegaard Casper, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 354 days.

(21) Appl. No.: 15/503,606

(22) PCT Filed: Aug. 18, 2015

(86) PCT No.: PCT/EP2015/068958
§ 371 (c)(1),
(2) Date: Feb. 13, 2017

(87) PCT Pub. No.: WO2016/026862
PCT Pub. Date: Feb. 25, 2016

(65) Prior Publication Data
US 2017/0234296 A1  Aug. 17, 2017

(30) Foreign Application Priority Data

Aug. 18, 2014 (EP) .................................. 14181240
Sep. 9, 2014 (GB) .................................. 1415890

(51) Int. Cl.
*B29C 70/48* (2006.01)
*F03D 1/06* (2006.01)
*B29K 105/08* (2006.01)
*B29L 31/08* (2006.01)

(52) U.S. Cl.
CPC ............ *F03D 1/0675* (2013.01); *B29C 70/48* (2013.01); *B29K 2105/08* (2013.01); *B29L 2031/085* (2013.01); *F05B 2230/00* (2013.01); *F05B 2230/50* (2013.01); *F05B 2230/60* (2013.01); *F05B 2280/6003* (2013.01); *F05B 2280/702* (2013.01); *Y02E 10/72* (2013.01); *Y02P 70/50* (2015.11)

(58) Field of Classification Search
CPC .............................. F03D 1/0675; B32B 3/266
See application file for complete search history.

(56) References Cited

U.S. PATENT DOCUMENTS

| 4,545,837 A | 10/1985 | Wehnert et al. | |
|---|---|---|---|
| 7,897,241 B2 * | 3/2011 | Rice | B32B 3/266 428/137 |
| 2007/0081900 A1 * | 4/2007 | Nies | F03D 1/065 416/224 |

FOREIGN PATENT DOCUMENTS

| DE | 112012003671 T5 | 7/2014 |
|---|---|---|
| EP | 1772621 A2 | 4/2007 |
| EP | 1840372 A2 | 10/2007 |

(Continued)

*Primary Examiner* — William P Watkins, III
(74) *Attorney, Agent, or Firm* — Nath, Goldberg & Meyer; Jerald L. Meyer; Tanya E. Harkins

(57) ABSTRACT

A component for a wind turbine blade is described having a reinforced through-going aperture. The reinforcement can be provide by way of a fibre rope arranged around the periphery of the aperture, or as fibre material arranged in a radially-extending arrangement from the aperture.

20 Claims, 10 Drawing Sheets

(56) References Cited

FOREIGN PATENT DOCUMENTS

| JP | 2009085009 A | 4/2009 |
|---|---|---|
| WO | 2012034566 A1 | 3/2012 |

\* cited by examiner

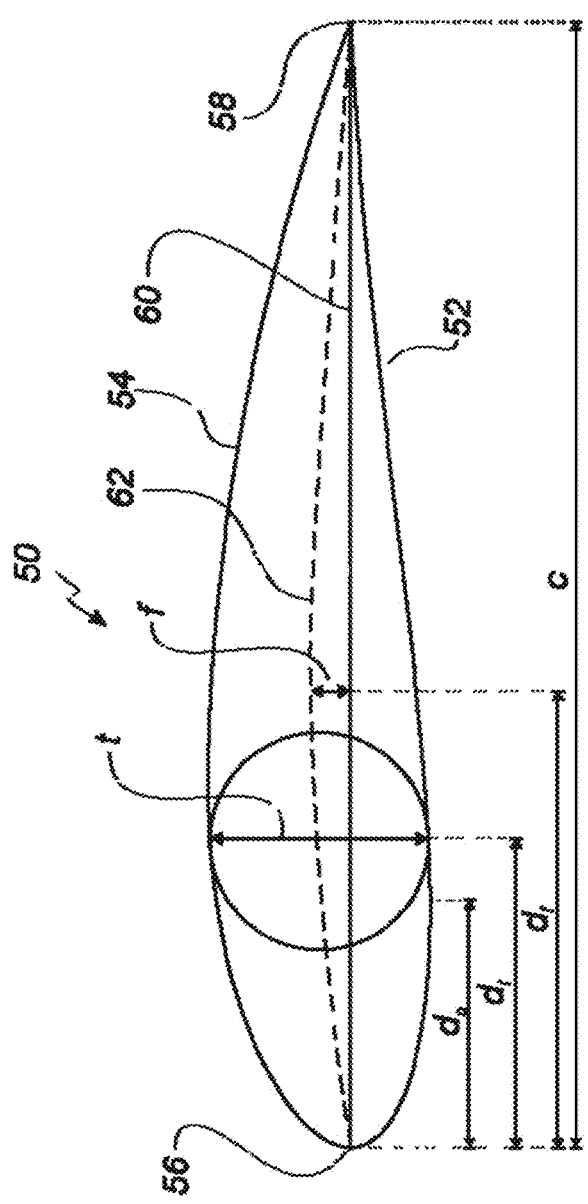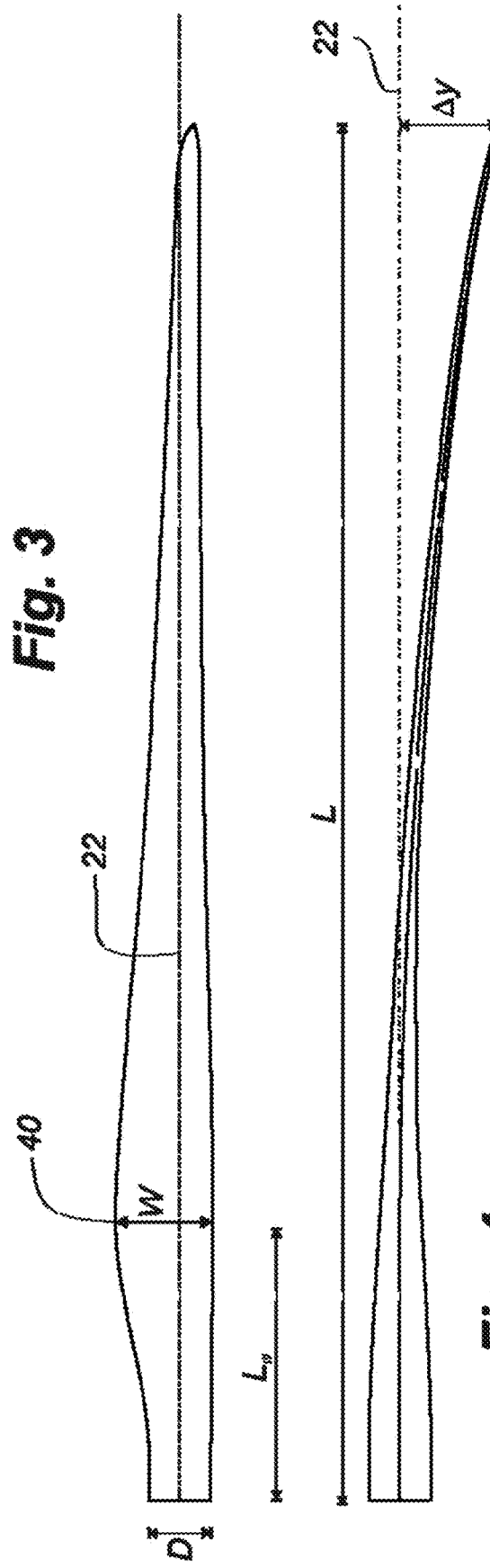

REINFORCED WIND TURBINE BLADE COMPONENT

This is a National Phase Application filed under 35 U.S.C. 371 as a national stage of PCT/EP2015/068958, filed Aug. 18, 2015, an application claiming the benefit of European Application No. 14181240.4, filed Aug. 18, 2014, and Great Britain Application No. 1415890.1, filed Sep. 9, 2014, the content of each of which is hereby incorporated by reference in its entirety.

FIELD OF THE INVENTION

The present invention relates to a reinforced component for a wind turbine blade, a wind turbine blade having such a component, and associated manufacturing and assembly methods.

BACKGROUND OF THE INVENTION

Wind turbine blades are generally produced to have operational lifetimes in the region of 10-20 years, during which time the components of the wind turbine blades are subjected to numerous stresses and strains. In fibre-reinforced composites, the concentration of such stresses and strains in the regions of structural discontinuities, e.g. apertures, material interfaces, etc., is often shown to be an initiation point for structural failure or fracture of the wind turbine blade components, requiring relatively expensive and time-consuming repair operations.

It is known to provide apertures in composite structures.

EP 1 772 621 A2 discloses a wind turbine blade, which is provided with an opening free of fibres, which is manufactured by letting fibres run around the opening and adding a matrix material in order to form a composite structure.

JP 2009 085009 discloses a wind turbine blade having a hollow beam.

U.S. Pat. No. 4,545,837 A discloses a composite structure comprising fibre reinforced resin matrix bushings.

It is an object of the invention to provide a wind turbine blade component and associated methods of manufacture and assembly having improved resistance to such structural failures.

SUMMARY OF THE INVENTION

Accordingly, there is provided a method of manufacturing a wind turbine blade component having improved structural characteristics, the method comprising the steps of:

providing a wind turbine blade component having at least one through-going aperture defined thereon; and applying a reinforcement element substantially about the periphery of said through-going aperture.

By reinforcing the periphery of the aperture, the structural forces experienced at the weak point of the aperture may be more evenly distributed about the aperture, thereby improving the resistance of the wind turbine blade component to fractures or faults due to stresses or strains experienced during wind turbine blade operation. It will be understood that the wind turbine blade component preferably comprises a fibre-reinforced composite component, e.g. comprising glass fibres and/or carbon fibres.

It will be understood that the through-going aperture may comprise a cut-out or contiguous aperture defined in a body of material. It will be understood that the through-going aperture may also comprise a through-going slot, slit or channel defined from or extending to an edge of a body of material, wherein said reinforcement element may be provided around a portion of the slot, in particular around an enlarged portion of the slot, for example for a keyhole-shaped aperture.

In an advantageous embodiment, the wind turbine blade component comprises: a sandwich panel body having a core and skin layers about said core; a through-going aperture provided in said sandwich panel body; and at least one reinforcement element provided substantially about a periphery of said aperture. The invention is particularly advantageous to wind turbine blade components made of a sandwich construction, since they are prone to the aforementioned fractures or faults. The core may advantageously be made of balsawood or a foamed polymer.

In one embodiment, said reinforcement element comprises a plurality of fibres, wherein a majority of said fibres are aligned to be substantially parallel with a radial direction of said aperture. Extending the fibre material in a radially-outwards direction allows for a portion of forces experienced at the edge of the aperture to be distributed outwardly from the aperture itself to other areas of the component body.

In another embodiment, said reinforcement element comprises a plurality of fibres, wherein a majority of said fibres are aligned to be substantially parallel to a circumferential direction of said aperture. This will distribute forces around the periphery of the aperture and thus minimise the risk of fracture formation.

Preferably, said step of applying a reinforcement element comprises applying at least one rope of fibre material substantially about the periphery of said through-going aperture.

Fibre material ropes are relatively cheap and easily produced elements, which can be easily handled and arranged to form suitable reinforcement of differently-shaped apertures. It will be understood that a fibre material rope may also cover a fibre bundle arranged as a rope.

Preferably, said rope of fibre material comprises a unidirectional fibre rope.

The use of unidirectional fibre rope more efficiently distributes forces around the periphery of the aperture, due to the common alignment of the fibres in the rope.

Preferably, said rope of fibre material comprises a glass fibre rope, a carbon fibre rope, and/or a hybrid thereof.

Additionally or alternatively, said step of applying a reinforcement element comprises applying at least one fibre material layer in or around said through-going aperture.

Fibre material may be used as patch reinforcement of apertures, and may be combined with other reinforcement elements to further improve the structural performance of the component.

Preferably, said step of applying a reinforcement element comprises wrapping said at least one fibre material layer about the internal periphery of said through-going aperture, preferably wherein opposite ends of said at least one fibre material layer are arranged on the surface of the wind turbine blade component at either side of the through-going aperture.

By wrapping the fibre material through the aperture, forces can be distributed evenly between opposite sides of the component.

Preferably, said step of wrapping comprises arranging said at least one fibre material layer wherein opposite ends of said fibre material layer extend radially outwards from said through-going aperture.

Extending the fibre material in a radially-outwards direction allows for a portion of forces experienced at the edge of the aperture to be distributed outwardly from the aperture itself to other areas of the component body.

Preferably, said at least one fibre material layer comprises a plurality of fibres, wherein a majority of said fibres are aligned to be substantially parallel with a radial direction of said aperture.

Providing fibre material with aligned fibres allows for the distribution of forces to be more accurately re-directed by the fibre material.

Preferably, said step of applying a reinforcement element comprises applying a plurality of overlapping pieces of fibre material layers, wherein opposite ends of said plurality of overlapping pieces of fibre material layers extend radially outwards from said through-going aperture.

In one aspect, said step of applying a reinforcement element comprises applying said reinforcement element to a surface of said wind turbine blade component adjacent said aperture.

In an additional or alternative aspect, said step of applying a reinforcement element comprises applying said reinforcement element within said aperture, preferably along the internal circumference of the aperture.

Preferably, said step of applying a reinforcement element comprises moulding said reinforcement element substantially about the periphery of said through-going aperture.

Preferably, said step of moulding comprises performing a resin transfer moulding (RTM) of said reinforcement element about the periphery of said through-going aperture, further preferably a vacuum-assisted resin transfer moulding (VARTM).

By moulding the reinforcement element to the blade component, the moulding pressure may act to effectively flatten the reinforcement against the component surface, and provide a more integrated interface between reinforcement and component.

Preferably, said step of moulding comprises applying a sealing member, preferably a vacuum bag, about said reinforcement element to define a mould cavity, infusing said mould cavity with a resin, and allowing said resin to cure.

In a first aspect, the method comprises the steps of:
providing a consolidated wind turbine blade component;
forming a through-going aperture in said consolidated wind turbine blade component.

In this case, the reinforcement may be applied to an existing component. The consolidated wind turbine blade component may comprise a pre-manufactured panel, plate, or shell member. The step of forming a through-going aperture may comprise a machining, cutting, drilling, etc., of the component.

In an additional or alternative aspect, the method comprises:
providing a core body having at least one through-going aperture;
arranging at least one reinforcement element about said at least one through-going aperture;
providing an insert in said at least one aperture, preferably within an internal boundary of said at least one reinforcement element;
moulding said reinforcement element to said core; and
after moulding, removing said insert to provide a component having reinforced through-going aperture.

In this case, the reinforcement may be performed as part of a manufacturing process of the component itself, e.g. during the infusion of a sandwich panel component.

Preferably, at least one reinforcement element is arranged within said at least one through-going aperture, preferably wherein said at least one reinforcement element is arranged in register with at least one external surface of said core body.

By arranging the reinforcement within the aperture, the reinforcement may be arranged with no external disturbance or disruption in the external shape of the component.

Preferably, the method comprises:
laminating skin layers about said core body and over said aperture;
wherein said step of moulding comprises moulding said skin layers about said core to form a sandwich panel component structure; and
after moulding, removing said insert to provide a component having reinforced through-going aperture.

It will be understood that said step of moulding comprises infusing said skin layers with a resin, and allowing said resin to harden or cure.

Preferably, said step of removing said insert comprises machining the skin layers of said consolidated component to provide access to said insert, and removing said insert.

It will be understood that said step of machining may comprise cutting said skin layers to provide access to said insert.

Preferably, said through-going aperture is provided as a substantially circular aperture.

Preferably, said at least one reinforcement element is arranged in at least one concentric ring about said aperture.

By arranging reinforcement as at least one concentric ring about an aperture, a reinforcement is provided which can be arranged to follow the shape of the aperture, providing an even distribution of the reinforcing effect.

It will be understood that the method can be performed retroactively, to reinforce an existing aperture, or the method can be performed as part of the manufacturing process for a wind turbine blade component.

There is also provided a wind turbine blade component having at least one through-going aperture defined thereon, wherein a reinforcement element is provided substantially about the periphery of said at least one through-going aperture.

Preferably, said reinforcement element comprises a rope of fibre material arranged substantially about the periphery of said through-going aperture.

Preferably, said rope of fibre material comprises a unidirectional fibre rope, preferably a glass fibre rope, a carbon fibre rope, and/or a hybrid thereof.

Preferably, said at least one through-going aperture is substantially circular, preferably wherein said reinforcement element is arranged in at least one concentric ring about said aperture.

Additionally or alternatively, said reinforcement element is arranged within said aperture, along an internal circumference of said aperture.

Preferably, said wind turbine blade component comprises:
a sandwich panel body having a core and skin layers about said core;
a through-going aperture provided in said sandwich panel body; and
at least one reinforcement element provided substantially about a periphery of said aperture.

Preferably, said at least one reinforcement element is provided within said aperture.

There is further provided a method of manufacture of a wind turbine blade, the method comprising:
assembling a wind turbine blade component as described above with at least one other wind turbine blade component to form a wind turbine blade.

There is further provided a wind turbine comprising at least one wind turbine blade as described above.

There is further provided an intermediate product in the form of a wind turbine blade component, the component comprising:
- a body;
- a through-going aperture defined in said body;
- a reinforcement element arranged substantially about the periphery of said through-going aperture; and
- an insert provided to seal said through-going aperture, said insert arranged to be removed from said product to provide a wind turbine blade component having a reinforced through-going aperture.

Preferably, said insert comprises a frustoconical or tapered plug.

Preferably, said through-going aperture comprises chamfered or tapered sides, said sides substantially corresponding to said frustoconical or tapered plug.

Preferably, said insert is formed of a substantially inert material, preferably a silicone plug.

DESCRIPTION OF THE INVENTION

Embodiments of the invention will now be described, by way of example only, with reference to the accompanying drawings, in which:

FIG. 3 shows a schematic view of an airfoil profile of the blade of FIG. 2;

FIG. 4 shows a schematic view of the wind turbine blade of FIG. 2, seen from above and from the side;

It will be understood that elements common to the different embodiments of the invention have been provided with the same reference numerals in the drawings.

Figure 1:
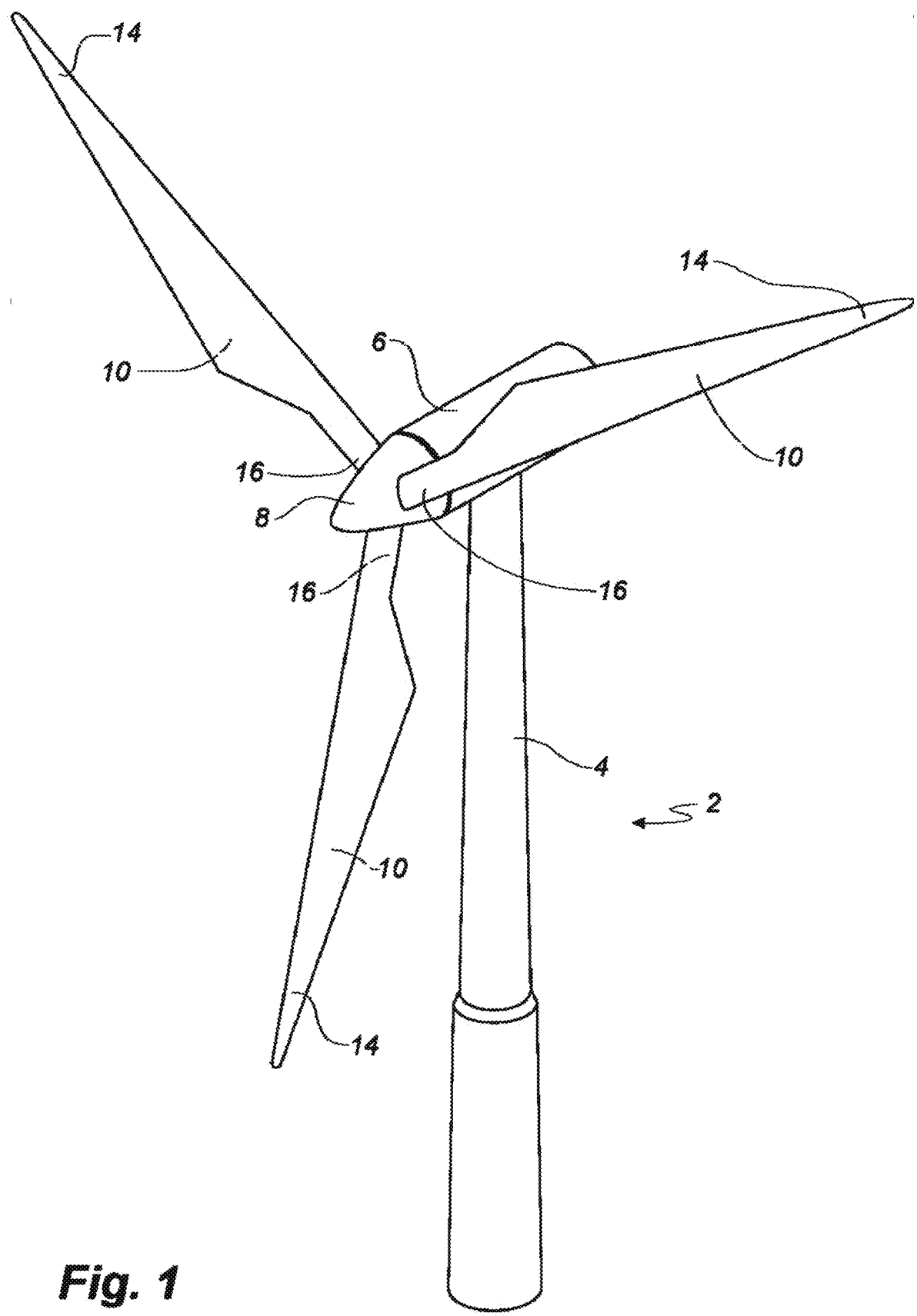
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
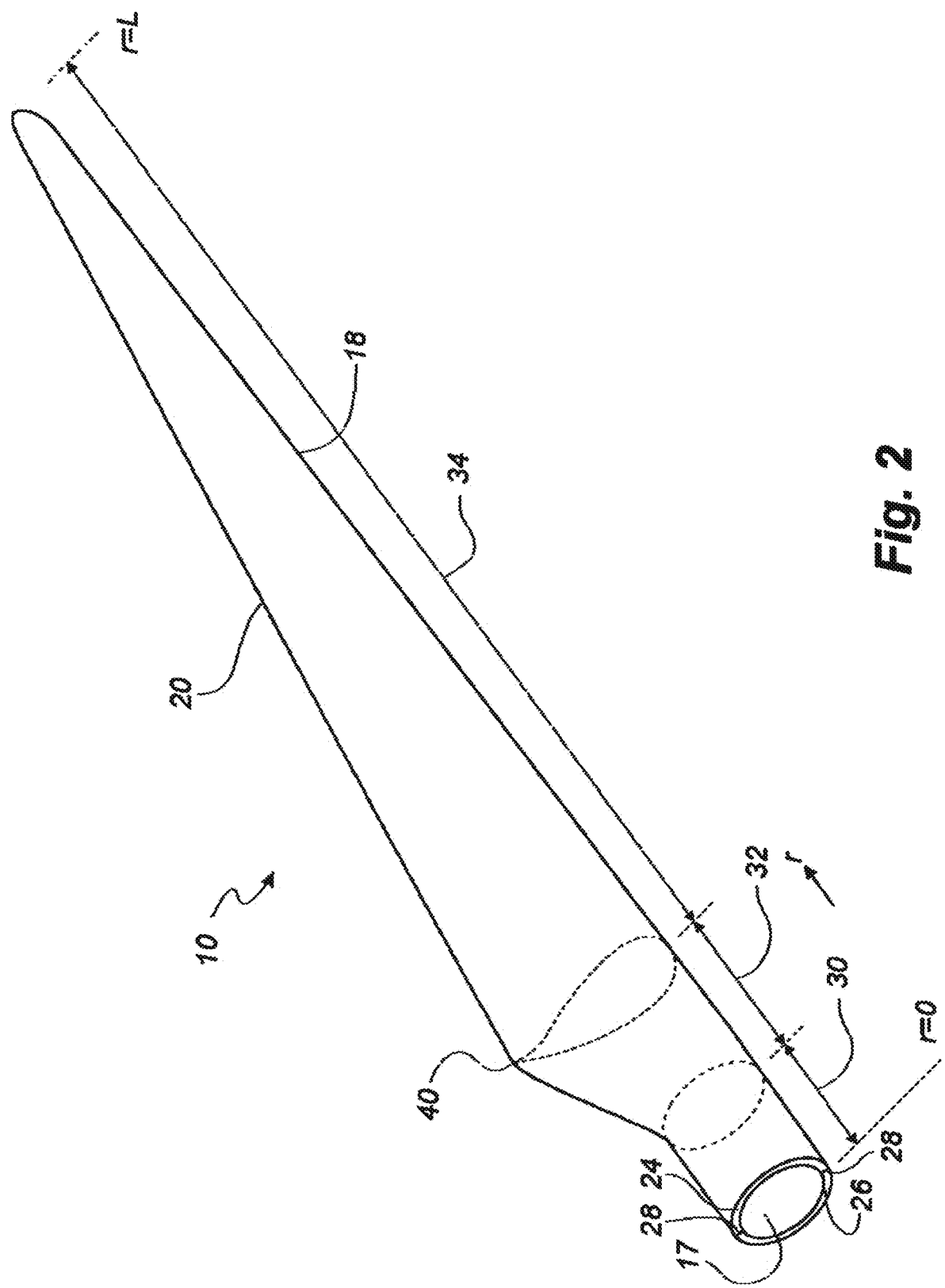
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

Different components of the wind turbine blade 10 can often comprise through-going apertures as part of the general wind turbine blade structure. Examples of such components having apertures can include:

- a blade shell body, having apertures arranged to receive service apparatus, e.g. hoists, cranes, rappelling systems, etc., and/or apertures to receive other wind turbine blade components, e.g. lightning receptors, mounting bolts, drainage valves, etc.;
- a wind turbine blade bulkhead panel, having apertures arranged as drain or pressure valves, and/or access ports;
- ducts or tubing for wind turbine heating or cooling systems, e.g. de-icing systems, wherein apertures in such ducts provides for fluid communication through said duct or tubing;
- a housing for a wind turbine blade component, e.g. a blade sensor system, communication device, etc., having apertures to provide communications outlets, drainage outlets, service access ports for internal components, etc.; or
- an aeroshell or fairing used to provide for adjusted aerodynamics of a portion of a wind turbine blade, having apertures arranged for mounting purposes, drainage purposes, to relieve structural stresses in the aeroshell, etc.

With reference to FIG. 5, a series of enlarged plan views of portions of reinforced wind turbine blade components according to the invention are illustrated.

Each of the components are shown as a section of a component body 70, having a through-going aperture 72 defined therein. While the apertures 72 shown in FIG. 5 are substantially circular apertures, it will be understood that any other shape of aperture may be provided, e.g. elliptical, rectangular, triangular, etc.

Figure 5A:
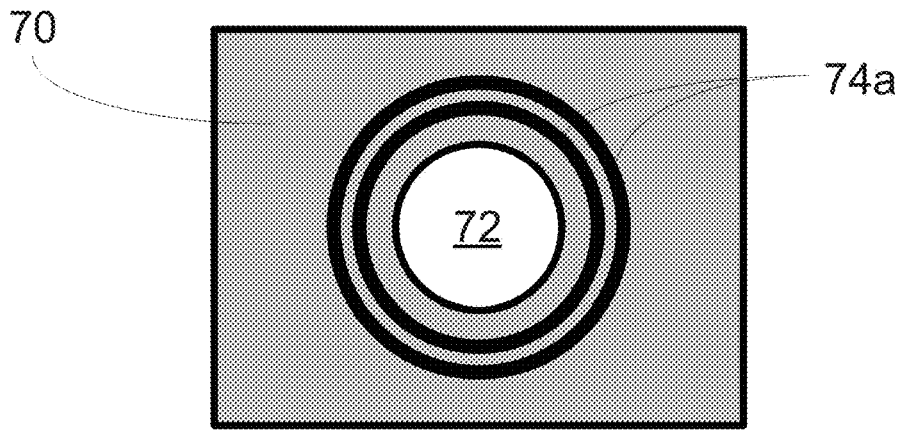
FIG. 5 illustrates a series of enlarged plan views of sections of wind turbine blade components according to various embodiments of the invention.

In FIG. 5(a), an embodiment of the invention is illustrated, wherein a reinforcement element in the form of two concentric rings of reinforcement material 74a are provided around the periphery of the through-going aperture 72. The reinforcement element preferably comprises a rope of fibre material applied around the circumference of the aperture 74a, preferably a unidirectional fibre rope. While the reinforcement element is shown as two concentric rings of reinforcement material 74, it will be understood that any number of rings may be used to provide the desired reinforcement effect about the periphery of the aperture.

Figure 5B:
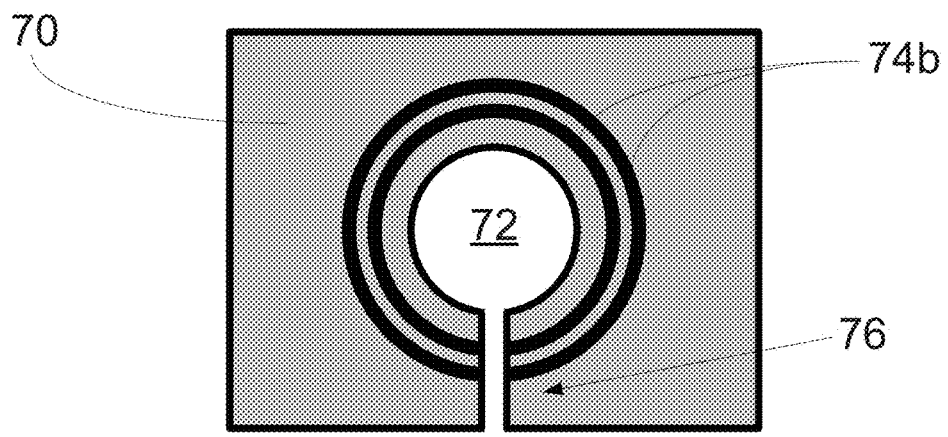

In the embodiment of FIG. 5(b), the through-going substantially circular aperture 72 is shown as being a portion of a larger aperture, such as a slot or slit 76 provided in the component body 70. In this case, the reinforcement element 74b is arranged around the majority of the periphery of the aperture 72, to provide for a localised reinforcement of the aperture 72. It will be understood that the reinforcement element 74b may be further extended to be adjacent to the slot or slit 76 if required (not shown).

By providing reinforcement of the component aperture through the arrangement of encircling reinforcement material, accordingly and stresses or strains experienced by the component at the location of the aperture can be more evenly distributed around the periphery of the aperture itself. Accordingly, the risk of a single area of stress concentration at the aperture is reduced, and the associated risk of a structural failure of the component at the aperture is decreased.

Figure 5C:
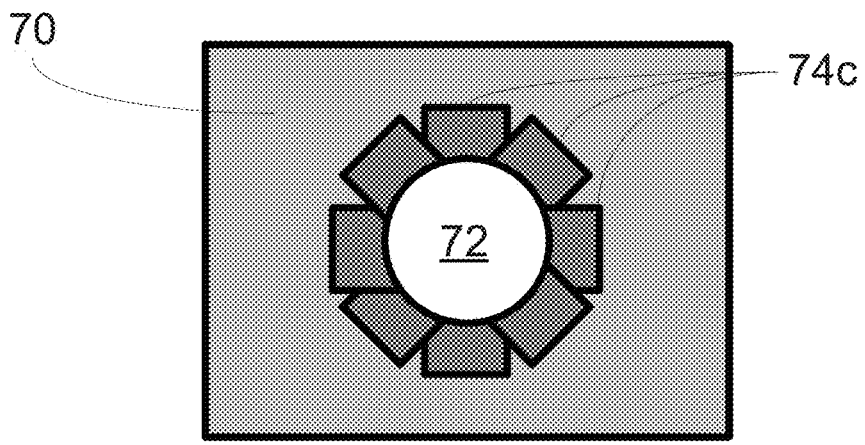

In the embodiment of FIG. 5(c), the reinforcement element is provided in the form of a plurality of pieces of fibre material 74c which are arranged to extend radially outwards from the aperture 72. Preferably, the fibre material 74c comprises a layer of a plurality of fibres, wherein a majority of the fibres in each piece of fibre material 74c are aligned to be substantially parallel with the direction of outward extension of the fibre material 74c. The pieced of fibre material 74c may be provided in a rosette-style arrangement extending outwardly from the edges of the aperture 72. It will be understood that the fibre material may comprise a plurality of transverse fibres arranged in a crosswise direction to the outwardly-extending parallel fibres, such that said plurality of transverse fibres may follow the aperture circumferential direction. Such an arrangement may further improve the strength of the aperture reinforcement.

As the pieces of fibre material extend radially outwards from the aperture, accordingly the stresses or strains experienced at the aperture can be distributed outwardly from the aperture via the reinforcing fibre material. As with the embodiments of FIGS. 5(a) and (b), this improved distribution of forces provides for a component having improved structural performance and reduced risk of failure.

With reference to FIG. 6, a series of cross-sectional views are shown illustrating different configurations of reinforcement of a through-going aperture of a wind turbine blade according to the invention. As discussed with regard to FIG. 5, the reinforcement is preferably provided through the use of fibre ropes and/or layers of fibre material.

The cross-sectional views are taken through a component body 70 on either side of a through-going aperture 72, showing opposite first and second surfaces 70a,70b of the component body 70 located at either side of the aperture 72.

Figure 6A:
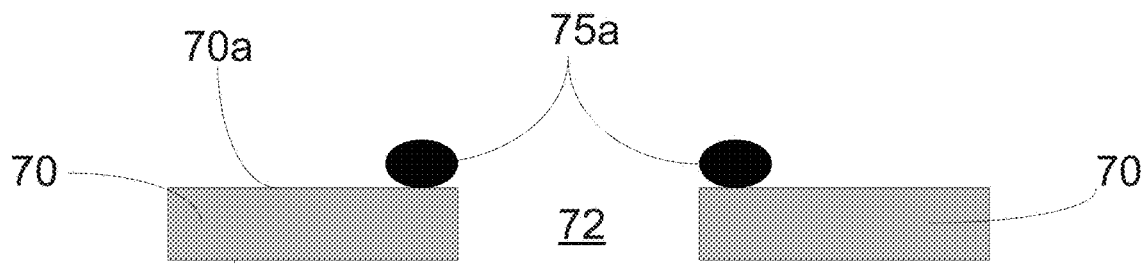
FIG. 6 illustrates a series of cross-sectional views of sections of wind turbine blade components according to various embodiments of the invention.

In FIG. 6(a), a reinforcement element 75a, preferably in the form of a fibre rope, is provided on the first surface 70a of the component body 70, the reinforcement element 75 arranged around the periphery of the through-going aperture 72.

Figure 6B:
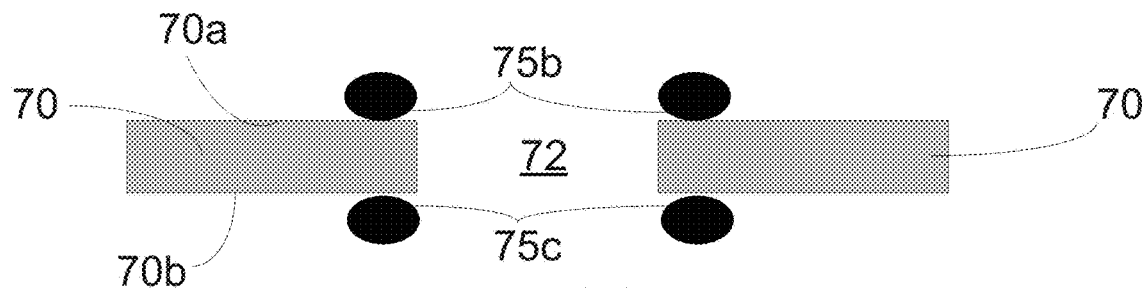

In FIG. 6(b), first and second reinforcement elements 75b,75c are provided on the respective first and second surfaces 70a,70b of the component body 70, the reinforcement elements 75b,75c arranged around the periphery of the through-going aperture 72.

Figure 6C:
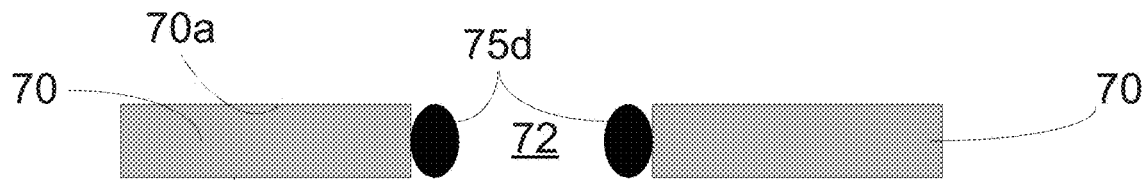
Figure 6D:
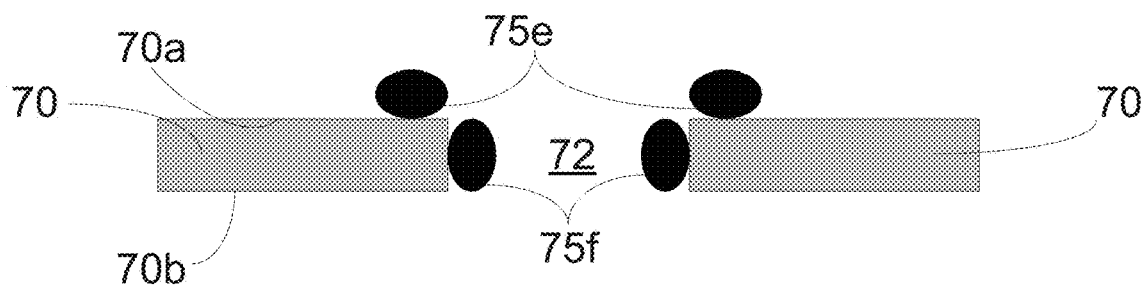

In FIG. 6(c), a reinforcement element 75d is positioned within the through-going aperture 72, the reinforcement element 75d arranged around the internal periphery or circumference of the aperture 72.

It will be understood that the above examples are not limiting, and various combinations of reinforcement may be utilised. For example, in FIG. 6(d), the reinforcement of the aperture 72 is provided through use of a first reinforcement element 75e provided on the first surface 70a of the component body 70 arranged around the periphery of the through-going aperture 72, and a second reinforcement element 75*f* positioned within the through-going aperture 72 and arranged around the internal periphery or circumference of the aperture 72.

In FIG. 6(*e*), corresponding to the embodiment shown in FIG. 5(*c*), the reinforcement of the aperture 72 is provided through the use of pieces of fibre material 75*g* which are arranged to extend radially outwards from the aperture 72. While the pieces of fibre material may be arranged on one or both of the first and second surfaces 70*a*,70*b*, the embodiment of FIG. 6(*e*) illustrates at least one piece of fibre material 75*g* having a first end 77*a* and a second end 77*b*, wherein the piece of fibre material is arranged to extend through the aperture 72 such that the first end 77*a* of the piece 75*g* is arranged on the first side 70*a* of the component body 70 adjacent the aperture 72 and the second end 77*b* of the piece 75*g* is arranged on the second side 70*b* of the component body 70 adjacent the aperture 72.

The reinforcement elements 74,75 may be attached to the component body 70 using any suitable method, e.g. adhesive bonding, a mechanical attachment method. It will be understood that the reinforcement elements 74,75 may also be provided as an integral part of the wind turbine blade component, included as part of the manufacturing process used for the component.

Figure 7A:
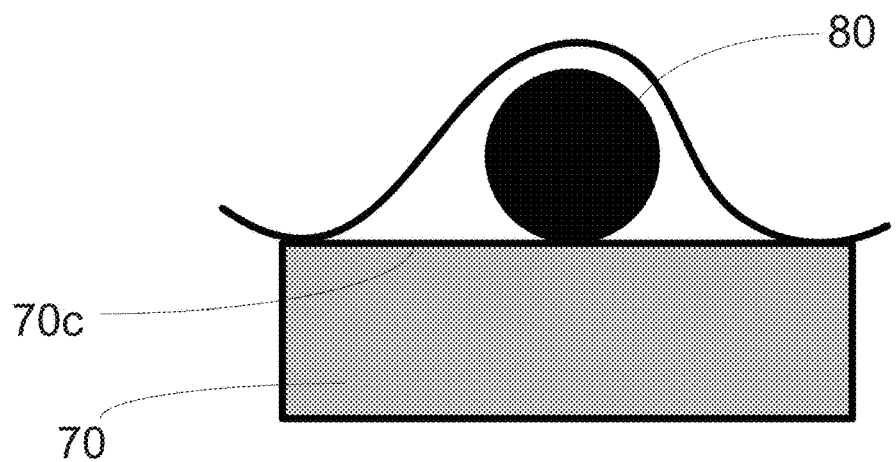
FIG. 7 illustrates a series of cross-sectional views of a method of manufacture according to an aspect of the invention.
Figure 7B:
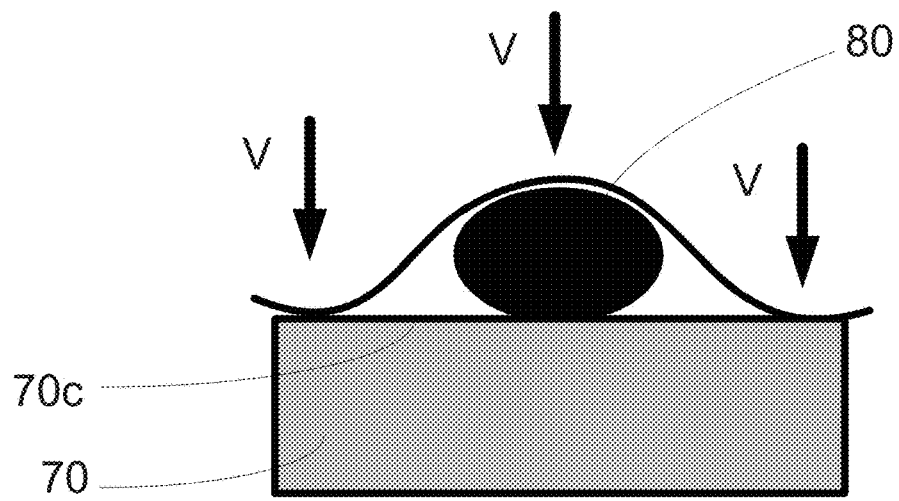
Figure 7C:
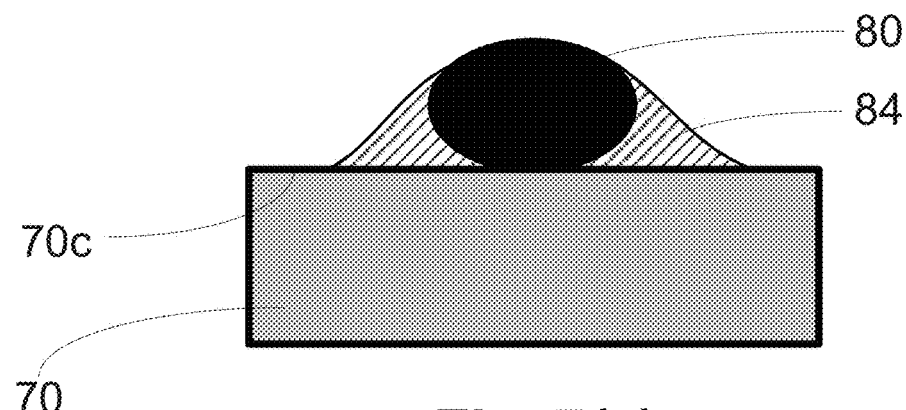

In a particularly preferred aspect, the reinforcement elements 74,75 are attached to the component body 70 by a moulding operation, preferably a Resin Transfer Moulding (RTM), further preferably a Vacuum-Assisted Resin Transfer Moulding (VARTM). With reference to FIG. 7, an advantage of the VARTM moulding approach is illustrated in a series of cross-sectional views.

In FIG. 7(*a*), a reinforcement element in the form of a fibre rope 80 is provided for attachment to a surface 70*c* of a wind turbine blade component body 70. The fibre rope 80 comprises a substantially circular cross-sectional profile. A sealing member 82, preferably in the form of a vacuum bag is applied over the fibre rope 80, forming a mould cavity between the sealing member 82 and the component body surface 70*c*.

During the VARTM operation, a vacuum is applied to the mould cavity, forcing the sealing member 82 to compress against the surface 70*c* of the component body 70, as indicated by the arrows V in FIG. 7(*b*). As a result, the fibre rope 80 is compressed against the surface 70*c* into a relatively flattened elliptical cross-sectional profile.

A suitable resin 84 is supplied to the mould cavity wherein the resin infuses the contained fibre rope 80. The resin 84 is then allowed to cure, to secure the fibre rope 80 to the surface 70*c* of the component body 70. The sealing member 82 can them be removed from the component 70, FIG. 7(*c*).

As the fibre rope 80 is compressed against the component body surface 70*c* by the VARTM operation, as a result the rope 80 has a reduced surface profile and is formed as a more integral part of the component body 70. Due to the reduced height of the rope 80 and the resin 84 attaching the rope 80 to the component body 70, the associated Energy Release Rate of the resin bonding interface between rope 80 and component 70 is decreased, providing a reduced risk of failure at the interface between the reinforcement element and the surface 70*c* of the component body 70.

Preferably, contact is provided between the fibres of the rope reinforcement or the reinforcement bundles and the existing fibres of the component body surface. In this way, a similar interface strength as the host laminate interplay strength can be expected from the reinforcement.

Additionally or alternatively, it will be understood that pressure may be applied against the fibre rope 80 to compress the rope against the component body surface 70*c*. Such pressure may be applied using any suitable means, e.g. pressure plates, clamping apparatus, etc.

FIG. 8 illustrates an embodiment of providing a reinforced aperture in a wind turbine blade component. FIG. 8(*a*) illustrates a cross-sectional view of a component body 70 having an aperture 72 defined therein. A reinforcement element 86, preferably in the form of a unidirectional fibre rope, is applied around the internal circumference of the aperture 72, FIG. 8(*b*).

An insert piece 88 is positioned in the aperture 72, within the boundary of the reinforcement element 86. The insert 88 acts to fill the space defined by the aperture 72, and may act to temporarily hold the reinforcement element 86 in place in the aperture 72, being compressed between the insert 88 and the walls of the aperture 72. The insert 88 is preferably formed from a relatively flexible, resilient material, e.g. a silicone or rubber plug piece. Preferably, the insert 88 is provided as a component that does not react with a resin used for infusion of wind turbine blade components With reference to FIG. 8(*d*), a plurality of layers of skin material 90, preferably fibre material layers, e.g. glass fibre and/or carbon fibre layers, are applied to first and second surfaces 70*a*,70*b* of the component body 70, wherein the skin material 90 is also applied over the area defined by the aperture 72 and filled by the reinforcement element 86 and the insert 88. The assembly of the component 70, reinforcement element 86, insert 88 and skin layers 90 may be arranged in a mould and/or sealed using a vacuum bag to define a moulding cavity (not shown), wherein the assembly is infused with a resin 92, e.g. such as a polyester resin, vinyl ester resin, epoxy resin, or other suitable resin. The resin 92 is allowed to cure and harden, such that the assembly of elements forms a consolidated component structure 94, as shown in FIG. 8(*d*).

In FIG. 8(*e*), the layers of skin material 90 arranged adjacent the insert 88 are removed, e.g. cut or machined, from the consolidated component structure 94. The insert 88 is accordingly revealed, which can then be removed from the consolidated component structure 94 to provide a component having a through-going aperture 72*a* reinforced with a reinforcement element 86 incorporated into the component structure. However, it will be understood that this step may be avoided through the provision of layers of skin material having pre-cut aperture portions corresponding to the dimensions and location of the desired through-going apertures.

Figure 8A:
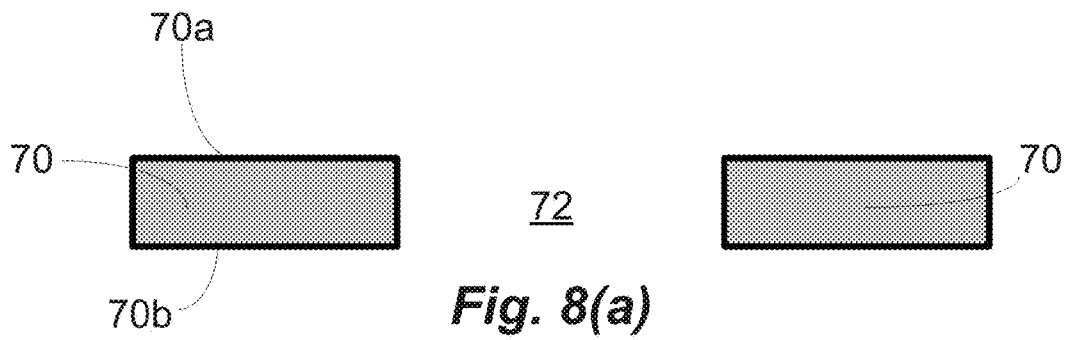
FIG. 8 illustrates a series of cross-sectional views of a method of manufacture according to an aspect of the invention.
Figure 8B:
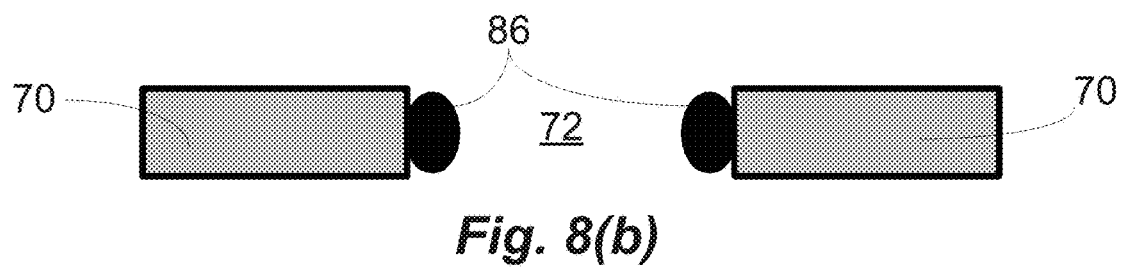
Figure 8C:
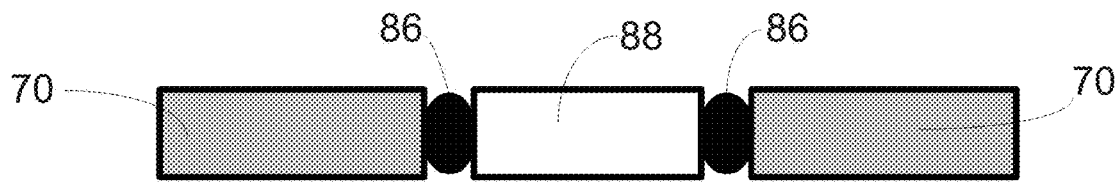
Figure 8D:
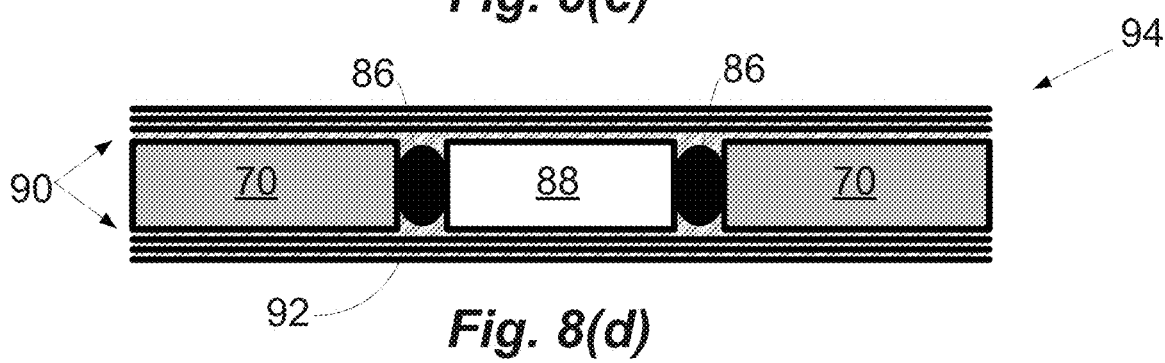
Figure 8E:
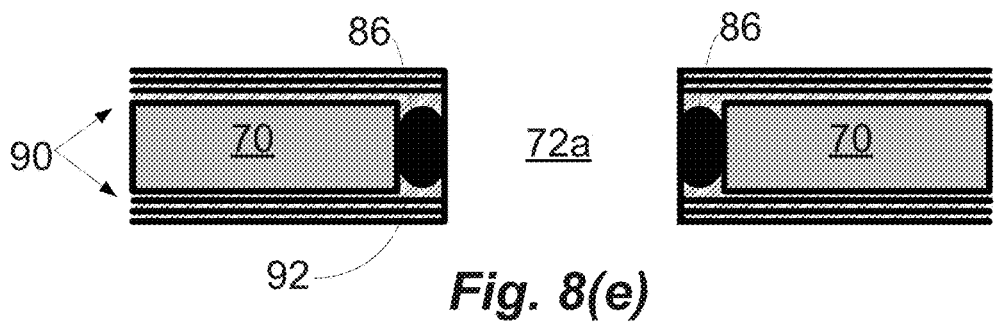
Figure 9A:
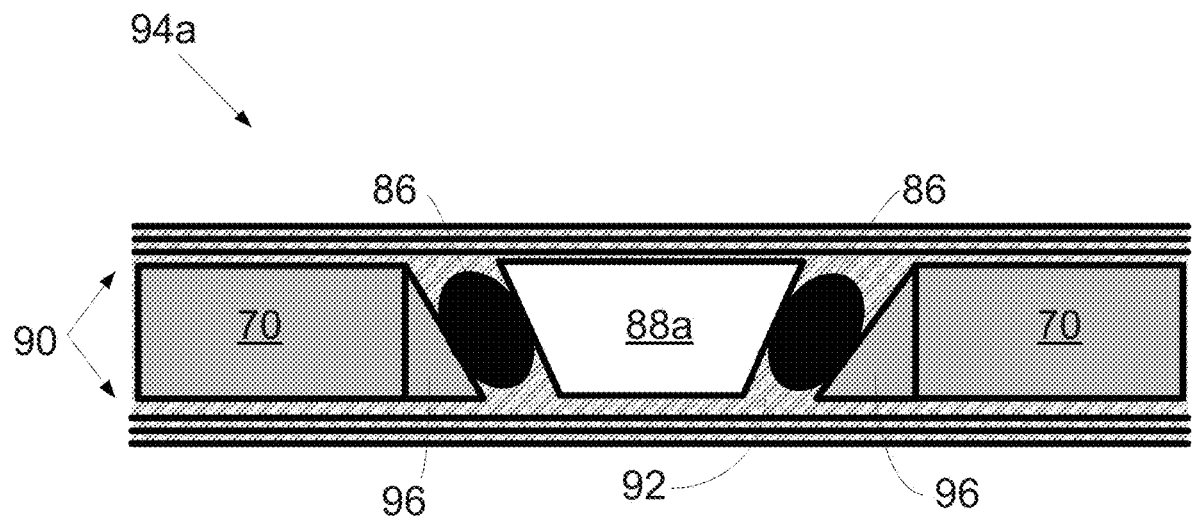
FIG. 9 illustrates a series of cross-sectional views of an alternative version of the method of FIG. 8.
Figure 9B:
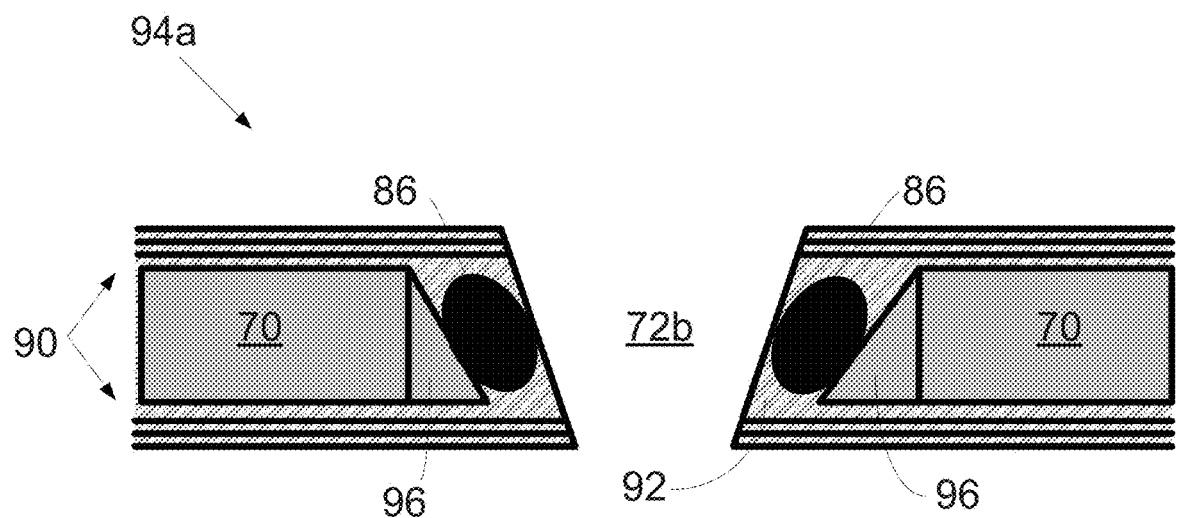

A further enhancement of the method illustrated in FIG. 8 is shown in FIG. 9. In FIG. 9(*a*), a consolidated wind turbine blade component structure 94*a* is shown, wherein wedge elements 96 are provided as part of the component structure 94*a*. The wedge elements 96 are used in the aperture 72 of the component 70, such that the aperture in the component 70 comprises chamfered or tapered edges. The reinforcement element 86 is accordingly applied around the internal circumference defined by the wedge elements 96.

An insert 88*a*, preferably a frustoconical insert, is positioned in the aperture, with the consolidated component structure 94*a* formed by the infusion of a suitable resin 92, as described in the embodiment of FIG. 8. Once the consolidated component structure 94*a* is formed, layers of skin material 90 arranged adjacent the insert 88*a* are removed, e.g. cut or machined, from the consolidated component structure 94a, and the insert 88a removed to present a component having a reinforced aperture 72a with chamfered or tapered edges.

With regard to FIGS. 8(d), 8(e) and FIG. 9, it will be understood that the reinforcement element 86 will preferably be positioned such that the element is in contact with the layers of skin material 90 applied on either side of the component 94,94a.

It will be understood that the wedge elements 96 may be provided as integral parts of the component body 70, e.g. by the cutting of a chamfered aperture in the initial component body 70. In addition, it will be understood that the component body is preferably provided without sharp corners in the region of the aperture, e.g. the corners shown in the attached figures are preferably chamfered or rounded. In the cases where the wind turbine blade component is formed as a sandwich panel body having skin layers applied around a core material, in a preferred aspect the skin layers of the component are applied in contact with at least a portion of the reinforcement material. In this manner, strains experienced by the component can be effectively transferred between the skin layers and the reinforcement material. In an additional or alternative aspect, the skin layers may be arranged to extend through apertures in the component, such that portions of skin layers of opposed surfaces of the component are in contact with each other.

Figure 6E:
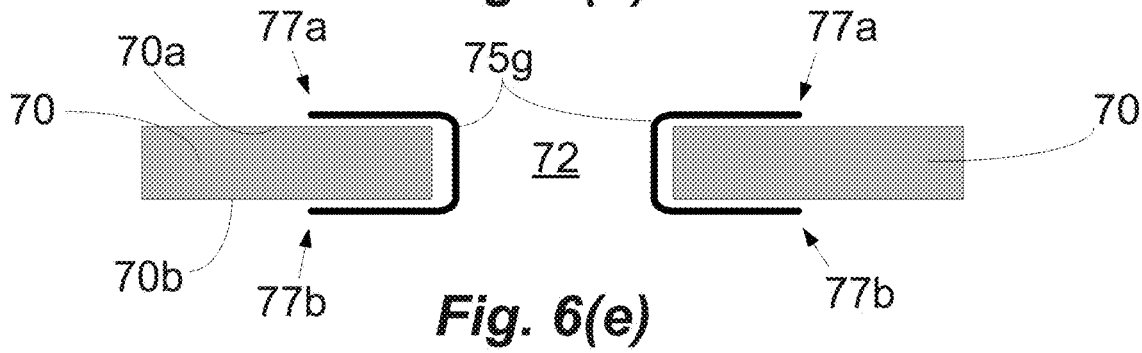

It will be understood that the embodiment shown in FIG. 6(e), using pieces of fibre material 75g as a reinforcement material, may be constructed in a similar manner to the embodiments of FIGS. 8 and 9.

The formation of sandwich components having reinforced apertures, as shown in the embodiments of FIGS. 8 and 9, are suitable for use as wind turbine blade shear webs, and/or as ducts for wind turbine blade heating or cooling systems.

Further possible embodiments of a method of reinforcing an aperture of a wind turbine blade component are illustrated in FIG. 10.

Figure 10A:
FIG. 10 illustrates a series of cross-sectional views of further embodiments of a method according to the invention.

FIG. 10(a) illustrates a cross-sectional view, wherein a fibre rope is provided in an aperture, with at least one additional layer of fibre reinforcement material in the form of a layer of fibre material applied over the fibre rope and extending to opposed sides of the aperture.

Figure 10B:

FIG. 10(b) shows an aperture having tapered or chamfered side walls, wherein fibre rope if provided around the periphery of the aperture on the chamfered side wall. The surface layers or skin layers of the wind turbine blade component may be continued over the fibre rope, with the surface layers of opposed sides of the component joined together at the edges of the aperture.

Figure 10C:

FIG. 10(c) shows a solution wherein the skin layers of opposed sides of the component may be joined at the midpoint of the aperture. It will be understood that this construction may be formed similar to the embodiment of FIG. 9, through use of a pair of opposing inserts applied from opposite sides of the component.

Figure 10D:

FIG. 10(d) illustrates a configuration wherein a fibre rope may be arranged in a spiral arrangement on a chamfered side wall of an aperture. A fibre rope selected for this embodiment may be chosen to have a relatively smaller diameter compared to the fibre ropes used in the above embodiments. This system may allow for increased surface contact between the reinforcement element and the surfaces of the component, thereby increasing the reinforced strength of the aperture.

Figure 10E:
Figure 10F:

FIG. 10(e) and FIG. 10(f) illustrate the manufacture of a further embodiment of the invention. In FIG. 10(e), an aperture is provided in a component, wherein skin layers of the component and/or reinforcement layers of fibre material are applied across the aperture, the layers from opposite sides of the component arranged to be joined within the aperture such that at least a portion of the layers extend along the side walls of the aperture. Resin may be applied to the layers and cured to form an intermediate product, wherein the aperture may be re-formed by cutting out the joined layers provided in the component aperture, as shown in FIG. 10(f).

Further enhancement may also be utilised, for example the reinforcement may be provided wherein overlapped triangular cuts of upper skin layers and/or reinforcement layers may be folded to extend down though a component aperture to meet lower skin layers provided on the opposite side of the component.

The invention is not limited to the embodiment described herein, and may be modified or adapted without departing from the scope of the present invention.

The invention claimed is:

1. A method of manufacturing a wind turbine blade component having improved structural characteristics, the method comprising the steps of:
    providing a wind turbine blade component made of a fibre-reinforced plastic and having at least one through-going aperture defined thereon, wherein the at least one through-going aperture comprises a through-going slot extending to an edge of the wind turbine blade component; and
    applying at least one separate reinforcement element substantially about a periphery of an enlarged portion of the through-going slot, wherein said at least one separate reinforcement element is separate and distinct from said wind turbine blade component and comprises a plurality of fibres.

2. The method of claim 1, wherein said wind turbine blade component comprises:
    a sandwich panel body having a core and skin layers about said core;
    the through-going aperture provided in said sandwich panel body; and
    the at least one separate reinforcement element provided substantially about the periphery of the enlarged portion of the through-going slot.

3. The method of claim 1, wherein a majority of said fibres of the at least one separate reinforcement element are aligned to be substantially parallel with a radial direction of said through-going aperture.

4. The method of claim 1, wherein a majority of said fibres of the at least one separate reinforcement element are aligned to be substantially parallel to a circumferential direction of said through-going aperture.

5. The method of claim 1, wherein said step of applying the at least one separate reinforcement element comprises applying at least one rope of fibre material substantially about the periphery of the enlarged portion of the through-going slot.

6. The method of claim 5, wherein said rope of fibre material comprises a unidirectional fibre rope.

7. The method of claim 5, wherein said rope of fibre material is compressed to a relatively flattened elliptical cross-sectional profile.

8. The method of claim 1, wherein said step of applying the at least one separate reinforcement element comprises applying at least one fibre material layer in or around said through-going aperture, preferably wrapping said at least one fibre material layer about the internal periphery of said through-going aperture.

9. The method of claim 1, wherein said step of applying the at least one separate reinforcement element comprises moulding said at least one separate reinforcement element substantially about the periphery of the enlarged portion of the through-going slot, preferably said step of moulding comprises performing a resin transfer moulding (RTM) of said at least one separate reinforcement element about the periphery of said through-going aperture, further preferably a vacuum-assisted resin transfer moulding (VARTM).

10. The method of claim 1, wherein the method comprises:
providing a core body having the at least one through-going aperture;
arranging the at least one separate reinforcement element about the enlarged portion of the through-going slot;
providing an insert in said at least one through-going aperture, preferably within an internal boundary of said at least one separate reinforcement element;
moulding said at least one separate reinforcement element to said core; and
after moulding, removing said insert to provide a component having a reinforced through-going aperture.

11. The method of claim 10, wherein the method comprises:
laminating skin layers about said core body and over said aperture;
wherein said step of moulding comprises moulding said skin layers about said core to form a sandwich panel component structure; and
after moulding, removing said insert to provide a component having reinforced through- going aperture.

12. The method of claim 1, wherein said through-going aperture is provided as a substantially circular aperture, and wherein said at least one separate reinforcement element is arranged in at least one concentric ring about the enlarged portion of the through-going slot.

13. A wind turbine blade component having at least one through-going aperture defined thereon, wherein the at least one through-going aperture comprises a through-going slot extending to an edge of the wind turbine blade component, wherein at least one separate reinforcement element is provided substantially about a periphery of an enlarged portion of the through-going slot, wherein said wind turbine blade component is made of a fibre-reinforced plastic, and wherein said at least one separate reinforcement element is separate and distinct from said wind turbine blade component and comprises a plurality of fibres.

14. The wind turbine blade component of claim 13, wherein said wind turbine blade component comprises:
a sandwich panel body having a core and skin layers about said core;
the through-going aperture provided in said sandwich panel body; and
the at least one separate reinforcement element provided substantially about the periphery of the enlarged portion of the through-going slot.

15. The wind turbine blade component of claim 13, wherein said at least one separate reinforcement element comprises a rope of fibre material arranged substantially about the periphery of the enlarged portion of the through-going slot.

16. The wind turbine blade component of claim 13, wherein said rope of fibre material comprises a unidirectional fibre rope, preferably a glass fibre rope, a carbon fibre rope, and/or a hybrid thereof.

17. The wind turbine blade component of claim 13, wherein said at least one through-going aperture is substantially circular, preferably wherein said at least one separate reinforcement element is arranged in at least one concentric ring about the enlarged portion of the through-going slot.

18. A method of manufacture of a wind turbine blade, the method comprising:
assembling a wind turbine blade component as claimed in claim 13 with at least one other wind turbine blade component to form a wind turbine blade.

19. A wind turbine comprising at least one wind turbine blade as claimed in claim 18.

20. An intermediate product in the form of a wind turbine blade component, the component comprising:
a body;
a through-going aperture defined in said body, wherein the at least one through-going aperture comprises a through-going slot extending to an edge of the body;
at least one separate reinforcement element arranged substantially about a periphery of an enlarged portion of the through-going slot, wherein said at least one separate reinforcement element is separate and distinct from said body and comprises a plurality of fibres; and
an insert provided to seal said through-going aperture, said insert arranged to be removed from said product to provide a wind turbine blade component having a reinforced through-going aperture, and wherein said wind turbine blade component is made of a fibre-reinforced plastic.

* * * * *